United States Patent [19]

Mink et al.

[11] Patent Number: 5,336,652
[45] Date of Patent: Aug. 9, 1994

[54] HIGH ACTIVITY POLYETHYLENE CATALYSTS PREPARED WITH ALKOXYSILANE REAGENTS

[75] Inventors: Robert I. Mink, Warren; Thomas E. Nowlin, West Windsor, both of N.J.

[73] Assignee: Mobil Oil Corporation, Fairfax, Va.

[21] Appl. No.: 788,386

[22] Filed: Nov. 6, 1991

[51] Int. Cl.$^5$ ............................................. B01J 31/12
[52] U.S. Cl. ...................... 502/125; 502/120
[58] Field of Search ........................ 502/125, 120

[56] References Cited

U.S. PATENT DOCUMENTS

| | | |
|---|---|---|
| 3,787,384 | 1/1974 | Stevens et al. |
| 4,063,009 | 12/1977 | Ziegler et al. |
| 4,076,698 | 2/1978 | Anderson et al. |
| 4,148,754 | 4/1979 | Strobel et al. |
| 4,173,547 | 11/1979 | Graff |
| 4,302,566 | 11/1981 | Karol et al. |
| 4,335,016 | 6/1982 | Dombro ............................. 502/125 |
| 4,374,753 | 2/1983 | Pullukat et al. ..................... 502/125 |
| 4,378,304 | 3/1983 | Dombro |
| 4,458,058 | 7/1984 | Dombro |
| 4,481,301 | 11/1984 | Nowlin et al. |

FOREIGN PATENT DOCUMENTS 0306939  3/1989  European Pat. Off.

Primary Examiner—Asok Pal
Assistant Examiner—P. Achutamurthy
Attorney, Agent, or Firm—Alexander J. McKillop; Malcolm D. Keen; Marina V. Schneller

[57] ABSTRACT

There is disclosed a highly active catalyst composition for polymerizing alpha-olefins prepared by treating a support with an organomagnesium composition and contacting the thus formed solid support, containing magnesium, with a silane compound of the empirical formula $$R^1{}_x SiR^2{}_y$$

wherein Si is silicon atom; x is 1, 2, 3, or 4 and y is 0, 1, 2, or 3, provided that x+y is 4; $R^1$ is $R_w$—O— wherein O is oxygen and $R_w$ is hydrocarbyl of 1 to 10 carbon atoms; and $R^2$ is halogen or hydrocarbyl of 1 to 10 carbon atoms, or hydrogen and a transition metal compound, e.g., a tetravalent titanium compound. This catalyst is particularly useful for the production of linear low density polyethylene polymers. Also disclosed are methods of preparing polymers with the catalyst composition and the resulting polymers.

23 Claims, No Drawings

HIGH ACTIVITY POLYETHYLENE CATALYSTS PREPARED WITH ALKOXYSILANE REAGENTS

FIELD OF THE INVENTION

The present invention relates to a method for polymerizing alpha-olefins, a catalyst for such a polymerization and a method for producing such a catalyst. A particular aspect of the present invention relates to a method for producing linear low density copolymers of ethylene, hereinafter referred to as "LLDPE".

Linear low density polyethylene polymers possess properties which distinguish them from other polyethylene polymers such as homopolymers of polyethylene. Certain of these properties are described in the Anderson et al U.S. Pat. No. 4,076,698.

BACKGROUND OF THE INVENTION

When the LLDPE resins are fabricated into injection-molded products, it is imperative to assure that such products are not susceptible to warping or shrinking. As is known to those skilled in the art, the degree of warping or shrinking can be predicted from the molecular weight distribution of the resins. Resins having a relatively narrow molecular weight distribution produce injection-molded products exhibiting a minimum amount of warping or shrinkage. Conversely, resins having a relatively broader molecular weight distribution produce injection-molded products more likely to undergo warping or shrinkage.

One of the measures of the molecular weight distribution of the resin is melt flow ratio (MFR), which is the ratio of high melt flow index (HLMI or $I_{21}$) to melt index ($I_2$) for a given resin. MFR is defined herein as the ratio of the high load melt index (HLMI or $I_{21}$) divided by the melt index ($I_2$), i.e., $$MFR = \frac{I_{21}}{I_2}$$

The melt flow ratio is believed to be an indication of the molecular weight distribution of the polymer, the higher the value, the broader the molecular weight distribution. Resins having relatively low MFR values, e.g., of about 20 to about 50, have relatively narrow molecular weight distribution. Additionally, LLDPE resins having such relatively low MFR values produce films of better strength properties than resins with high MFR values.

By comparison, the molecular weight per se of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by measurable positive change in melt index ($I_2$) of the polymer produced.

Another important property of an ethylene and alpha-olefin copolymerization catalyst composition is the ability thereof to effectively copolymerize ethylene with higher alpha-olefins, e.g., $C_3-C_{10}$ alpha-olefins, to produce resins having low densities. Such resins have important advantages, e.g., they are used to produce polyethylene film with excellent physical properties which is, therefore, substantially more resistant to tearing and puncturing than a film made from similar resins of higher densities. This property of the catalyst composition is referred to as "higher alpha-olefin incorporation property" and is usually measured by determining the amount of higher alpha-olefin (e.g., butene, hexene or octene) required in the polymerization process, e.g. fluid-bed reactor process, to produce a copolymer of ethylene and the higher alpha-olefin having a given density. The lesser is the amount of the higher alpha-olefin required to produce a resin of a given density, the higher are the production rates and, therefore, the lower is the cost of producing such a copolymer. Catalysts having good higher α-olefin incorporation properties are referred to in the art as having a high α-olefin incorporation factor. High values of the high α-olefin incorporation factor are especially important in the gas-phase fluid bed process, because relatively high concentrations of higher α-olefin in the fluid-bed reactor may cause poor fluidization caused, e.g., by resin stickiness. Therefore, production rates must be significantly reduced to avoid such problems. Consequently, catalyst compositions with a relatively high α-olefin incorporation factor values avoid these problems and are more desirable.

Accordingly, it is important to provide a catalyst composition capable of producing ethylene copolymers having relatively narrow molecular weight distribution (low MFR values) and low densities.

It is therefore a primary object of the present invention to provide a high activity catalyst for the polymerization of alpha-olefins yielding products of a relatively narrow molecular weight distribution.

It is an additional object of the present invention to provide a catalytic process for polymerizing alpha-olefins which yields linear low density polyethylene of a relatively narrow molecular weight distribution at high productivity.

SUMMARY OF THE INVENTION

A supported alpha-olefin polymerization catalyst composition of this invention is prepared in a multi-step process. In the first step, a mixture of a solid, porous carrier and a non-polar solvent is contacted with at least one organomagnesium composition of the formula

where R and R' are the same or different $C_2-C_{12}$ alkyl groups, preferably $C_4-C_{10}$ alkyl groups, more preferably $C_4-C_8$ alkyl groups, and most preferably both R and R' are butyl groups, and m and n are each 0, 1 or 2, providing that m+n is equal to the valence of Mg.

Subsequently, the mixture of the first step is contacted with at least one silane compound of formula,

wherein Si is silicon atom; x is 1, 2, 3, or 4 and y is 0, 1, 2, or 3, provided that x+y is 4; $R^1$ is $R_w$—O— wherein O is oxygen and $R_w$ is hydrocarbyl of 1 to 10 carbon atoms; and $R^2$ is halogen, preferably chlorine, or hydrocarbyl of 1 to 10 carbon atoms, or hydrogen. The mixture is then contacted with at least one transition metal compound soluble in the non-polar solvent. The resulting mixture is subsequently contacted with a trialkyl aluminum.

The resulting activated catalyst composition has substantially higher productivity in the polymerization of alpha-olefins, and substantially improved higher comonomer (i.e., $C_3-C_{10}$ alpha-olefin) incorporation properties, than similar catalyst compositions prepared without the silane compound. The catalyst also produces polymers having relatively narrow molecular weight distribution and low density.

DETAILED DESCRIPTION

In accordance with an aspect of the present invention, supported titanium is incorporated onto a suitable support by impregnating this support with reactive magnesium and utilizing this supported reactive magnesium to react with tetravalent titanium (i.e., titanium in the plus 4 valence state) in a liquid medium. Unreacted titanium is soluble in this liquid medium, while reacted titanium and supported reactive magnesium are insoluble in this liquid medium.

As used herein, the concept of supporting a material on a carrier is intended to connote the incorporation of material (e.g., magnesium compositions and/or titanium compositions) onto the carrier by physical or chemical means. Accordingly, supported material need not necessarily be chemically bound to the carrier.

Catalysts produced according to aspects of the present invention may be described in terms of the manner in which they can be made. More particularly, these catalysts can be described in terms of the manner in which a suitable carrier may be treated in order to form such catalysts.

Suitable carrier materials which may be treated include solid, porous carrier materials such as silica, alumina and combinations thereof. Such carrier materials may be amorphous or crystalline in form. These carriers may be in the form of particles having a particle size of from about 0.1 micron to about 250 microns, preferably from 10 to about 200 microns, and most preferably from about 10 to about 80 microns. Preferably, the carrier is in the form of spherical particles, e.g., spray dried silica.

The carrier material is also porous. The internal porosity of these carriers may be larger than 0.2 cm$^3$/gm, e.g., larger than about 0.6 cm$^3$/g. The specific surface area of these carriers is at least 3 m$^2$/g, preferably at least about 50 m$^2$/g, and more preferably from, e.g., about 150 to about 1500 m$^2$/g.

It is desirable to remove physically bound water from the carrier material prior to contacting this material with water-reactive magnesium compounds. This water removal may be accomplished by heating the carrier material to a temperature from about 100° C. to an upper limit of temperature represented by the temperature at which change of state or sintering occurs. A suitable range of temperatures may, thus, be from about 100° C. to about 800° C., e.g., from about 150° C. to about 650° C.

Silanol groups represented by a presence of Si-OH groups in the carrier, may be present when the carrier is contacted with water-reactive magnesium compounds in accordance with an aspect of the present invention. These Si-OH groups may be present at about 0.3 mmoles or more of OH groups per gram of carrier. Accordingly, an amount of, e.g., from about 0.5 to about 5 mmoles of OH groups per gram of carrier may be present, but a preferred range is from about 0.4 to about 0.9 mmoles of OH groups per gram of carrier. Excess OH groups present in the carrier may be removed by heating the carrier for a sufficient time at a sufficient temperature to accomplish the desired removal. More particularly, for example, a relatively small number of OH groups may be removed by sufficient heating at from about 150° C. to about 250° C., whereas a relatively large number of OH groups may be removed by sufficient heating at at least 500° or 800° C., most especially, from about 550° C. to about 650° C. The duration of heating may be overnight, e.g., 16 hours or a shorter period, e.g., at least 4 hours. In a most preferred embodiment, the carrier is silica which, prior to the use thereof in the first catalyst synthesis step, has been dehydrated by fluidizing it with nitrogen or air and heating at least about 600° C. for about 16 hours to achieve a surface hydroxyl group concentration of about 0.7 millimoles per gram (mmols/gm). The surface hydroxyl concentration of silica may be determined according to J. B. Peri and A. L. Hensley, Jr., *J. Phys. Chem.*, 72 (8), 2926 (1968). The silica of the most preferred embodiment is a high surface area, amorphous silica (surface area=300 m$^2$/gm; pore volume of 1.65 cm$^3$/gm), and it is a material marketed under the tradenames of Davison 952 or Davison 955 by the Davison Chemical Division of W. R. Grace and Company. When silica which has been dehydrated by fluidizing with nitrogen or air and heating at about 600° C. for about 16 hours, the surface hydroxyl concentration is about 0.72 mmols/g. The silica used may be a high surface area, amorphous silica (surface area=300 m$^2$/g; pore volume of 1.65 cm$^3$ per gram) marketed under the tradename Davison 952 by the Davison Division of W. R. Grace and Co.

While heating is a preferred means of removing OH groups inherently present in a carrier such as silica, other removal means are also possible such as chemical means. For example, a desired proportion of OH groups may be reacted with a chemical agent such as a hydroxyl reactive aluminum compound, e.g., triethylaluminum.

Other examples of suitable carrier materials are described in the Graff, U.S. Pat. No. 4,173,547. Note particularly the passage extending from column 3, line 62 to column 5, line 44 of this Graff patent. It is noted that internal porosity of carriers can be determined by a technique termed BET-technique, described by S. Brunauer, P. Emmett and E. Teller in *Journal of the American Chemical Society*, 60, pp. 209–319 (1938). Specific surface areas of carriers can also be measured in accordance with the above-mentioned BET-technique, with use of the standardized method as described in *British Standards* BS 4359, Volume 1, (1969).

The carrier material is slurried in a non-polar solvent and the resulting slurry is contacted with at least one organomagnesium composition. The slurry of the carrier material in the solvent is prepared by introducing the carrier into the solvent, preferably while stirring, and heating the mixture to about 25° to about 100° C., preferably to about 40° to about 60° C. The slurry is then contacted with the aforementioned organomagnesium composition, while the heating is continued at the aforementioned temperature.

The organomagnesium composition has the empirical formula

$$R_m \, Mg \, R'_n$$

where R and R' are the same or different C$_2$–C$_{12}$ alkyl groups, preferably C$_4$–C$_{10}$ alkyl groups, more preferably C$_4$–C$_8$ alkyl groups, and most preferably both R and R' are butyl groups, and m and n are each 0, 1 or 2, providing that m+n is equal to the valence of Mg.

Suitable non-polar solvents are materials in which all of the reactants used herein, e.g., the organomagnesium composition, the transition metal compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene and ethylbenzene, may also be employed. The most preferred non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium composition that will be deposited—physically or chemically—onto the support since any excess of the organomagnesium composition in the solution may react with other synthesis chemicals and precipitate outside of the support. The carrier drying temperature affects the number of sites on the carrier available for the organomagnesium composition—the higher the drying temperature the lower the number of sites. Thus, the exact molar ratio of the organomagnesium composition to the hydroxyl groups will vary and must be determined on a case-by-case basis to assure that only so much of the organomagnesium composition is added to the solution as will be deposited onto the support without leaving any excess of the organomagnesium composition in the solution. Furthermore, it is believed that the molar amount of the organomagnesium composition deposited onto the support is greater than the molar content of the hydroxyl groups on the support. Thus, the molar ratios given below are intended only as an approximate guideline and the exact amount of the organomagnesium composition in this embodiment must be controlled by the functional limitation discussed above, i.e., it must not be greater than that which can be deposited onto the support. If greater than that amount is added to the solvent, the excess may react with the reagents added subsequently to form the catalyst of the invention, thereby forming a precipitate outside of the support which is detrimental in the synthesis of our catalyst and must be avoided. The amount of the organomagnesium composition which is not greater than that deposited onto the support can be determined in any conventional manner, e.g., by adding the organomagnesium composition to the slurry of the carrier in the solvent, while stirring the slurry, until the organomagnesium composition is detected as a solution in the solvent.

For example, for the silica carrier heated at about 600° C., the amount of the organomagnesium composition added to the slurry is such that the molar ratio of Mg to the hydroxyl groups (OH) on the solid carrier is about 1:1 to about 4:1, preferably about 1.1:1 to about 2.8:1, more preferably about 1.2:1 to about 1.8:1 and most preferably about 1.4:1. The organomagnesium composition dissolves in the non-polar solvent to form a solution from which the organomagnesium composition is deposited onto the carrier.

It is also possible to add such an amount of the organomagnesium composition which is in excess of that which will be deposited onto the support, and then remove, e.g., by filtration and washing, any excess of the organomagnesium composition. However, this alternative is less desirable than the most preferred embodiment described above.

Preferably, the carrier should be impregnated such that the pores of same contain reactive solid magnesium containing composition. A preferred means of accomplishing this result is by incorporating a porous carrier in a liquid medium containing dissolved organomagnesium composition and allowing magnesium to become impregnated into the pores of the carrier by (1) a reaction of the organomagnesium composition with the carrier, by (2) a precipitation of magnesium from the organomagnesium composition onto the carrier or by (3) a combination of such reaction and precipitation. Evaporation of the non-polar solvent which is a non-Lewis base liquid from this step would obtain a carrier, containing magnesium, in the form of a dry, free-flowing powder.

It is noted that if the organomagnesium compound is only sparingly soluble, e.g., to the extent of even 1 percent or less, reactive organomagnesium which is consumed by reactive sites on the carrier will be replaced by further dissolution of undissolved organomagnesium by a mass action effect.

Accordingly, it may be possible to incorporate a magnesium composition onto a carrier by reacting an organomagnesium composition with reactive OH groups of the carrier.

The amount of magnesium composition which is impregnated onto the carrier should be sufficient to react with the silane compound and then the tetravalent titanium compound in order to incorporate a catalytically effective amount of titanium on the carrier in the manner set forth hereinbelow. When a liquid containing an organomagnesium composition is contacted with a carrier the amount of magnesium in this liquid in terms of mmoles may be essentially the same as that stated above with respect to that which is impregnated onto the carrier.

An essential component in the production of the catalyst composition of the invention is a silane compound which is free of hydroxy groups. The silane compound has the empirical formula $$R^1{}_x SiR^2{}_y$$

wherein Si is silicon atom; x is 1, 2, 3, or 4 and y is 0, 1, 2, or 3, provided that x+y is 4; $R^1$ is $R_w$—O— wherein O is oxygen and $R_w$ is hydrocarbyl of 1 to 10 carbon atoms; and $R^2$ is halogen, preferably chlorine, hydrogen or hydrocarbyl of 1 to 10 carbon atoms. Preferred species of that empirical formula are those defined by Si(OR)$_4$ wherein R is $C_1$-$C_{10}$ hydrocarbyl and Si(R"O)$_n$(R''')$_{(4-n)}$ wherein R''' is halogen, preferably chlorine, or $C_1$-$C_{10}$ hydrocarbyl or hydrogen. Hydrocarbyl groups include alkyl, aryl, arylalkyl, alkenyl and arylalkenyl, containing 1 to 10 carbon atoms. Specific silane compounds which can be used in accordance with the invention include tetramethoxysilane, dimethoxydimethylsilane tetraethoxysilane, phenoxytrimethylsilane, triethoxyethylsilane, diethoxydiethylsilane, chlorotriethoxysilane, phenyltriethoxysilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, diethoxydiphenylsilane, tetraphenoxysilane, triethoxyphenylsilane, hexamethyldisiloxane, hexaethydisiloxane, octaethyltrisiloxane, polydimethylsiloxane, polydiphenylsiloxane, polymethylhydrosiloxane, polyphenylhydrosiloxane, tetrakis(2-methoxyethoxy)silane, tetrakis(2-ethylhexoxy) silane, tetraallyloxysilane and octamethyltrisiloxane.

The slurry of the carrier material and of organomagnesium composition in the solvent is maintained at temperatures of about 40° to about 60° C., for introduction of the silane compound. The silane compound is introduced after organomagesium incorporation and preferably before transition metal incorporation into the catalyst. The amount of the silane compound added to the slurry is such that the molar ratio of silane to Mg on the solid carrier is about 0.20 to about 1.40, preferably about 0.30 to about 0.90, more preferably about 0.50 to about 0.80 and most preferably about 0.66.

The slurry is contacted with at least one transition metal compound soluble in the non-polar solvent, preferably, after the addition of the silane compound is completed. This synthesis step is conducted at about 25° to about 65° C., preferably at about 30° to about 60° C., and most preferably at about 45° to about 55° C. In a preferred embodiment, the amount of the transition metal compound added is not greater than that which can be deposited onto the carrier. The exact molar ratio of Mg to the transition metal and of the transition metal to the hydroxyl groups of the carrier will therefore vary (depending, e.g., on the carrier drying temperature) and must be determined on a case-by-case basis. For example, for the silica carrier heated at about 200° to about 850° C., the amount of the transition metal compound is such that the molar ratio of the transition metal, derived from the transition metal compound, to the hydroxyl groups of the carrier is about 1 to about 2.0, preferably about 1.3 to about 2.0. The amount of the transition metal compound is also such that the molar ratio of Mg to the transition metal is about 1 to about 3, preferably about 1 to about 2. These molar ratios appear to produce a catalyst composition which produces resins having relatively low melt flow ratio values of about 20 to about 30. As is known to those skilled in the art, such resins can be utilized to produce high strength films or injection molding products which are resistant to warping and shrinking.

Suitable transition metal compounds used herein are compounds of metals of Groups IVA, VA, VIA or VIII of the Periodic Chart of the Elements, as published by the Fisher Scientific Company, Catalog No. 5-702-10, 1978 providing that such compounds are soluble in the non-polar solvents. Non-limiting examples of such compounds are titanium halides (e.g., where the halide portion thereof is Cl or Br), e.g., titanium tetrachloride, $TiCl_4$, titanium alkoxides (e.g., where the alkoxide portion thereof is a $C_1$–$C_6$ alkoxide), or mixtures thereof, and vanadium halides, vanadium tetrachloride, $VCl_4$, vanadium oxytrichloride, $VOCl_3$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride. Mixtures of such transition metal compounds may also be used and generally no restrictions are imposed on the transition metal compounds which may be included. Any transition metal compound that may be used alone may also be used in conjunction with other transition metal compounds.

The reaction of the transition metal compound, such as the tetravalent titanium compound, in the liquid medium conveniently takes place by slurrying the solid carrier containing the reactive magnesium composition in a solution of the tetravalent titanium compound and heating the liquid reaction medium to a suitable reaction temperature, e.g., to the reflux temperature of the solvent at standard atmospheric pressure. Thus, the reaction may take place under reflux conditions. Preferred solvents for the tetravalent titanium compound are hexane or isopentane.

The various reaction parameters are subject to a wide variety of possibilities, suitable selection of such parameters being well within the skill of those having ordinary skill in the art. However, for example, the volume of tetravalent titanium solution to treated carrier initially slurried in the solution may be from about 0.1 to about 10 mls per gram of such carrier. The concentration of the tetravalent titanium solution may be, for example, from about 0.1 to about 9 Molar. The amount of tetravalent titanium in solution may be, e.g., in excess of the molar amount of organomagnesium earlier used to treat the carrier. More particularly, for example, the molar ratio of tetravalent titanium to organomagnesium may be from about 0.5 to about 5, more particularly from about 0.7 to about 1.4. Unreacted titanium may be removed by suitable separation techniques such as decantation, filtration and washing.

The supported catalyst formed from the four components described above is then activated with suitable activators. Suitable activators include organometallic compounds. Preferably, the activators are trialkylaluminum compounds. More preferably, the activators are triethylaluminum or trimethylaluminum. The most preferred activator is trimethylaluminum.

The catalyst may be activated in situ by adding the activator and catalyst separately to the polymerization medium. It is also possible to combine the catalyst and activator before introduction into the polymerization medium, e.g., for up to about 2 hours at a temperature from about −40° to about 80° C.

A suitable activating amount of the activator may be used. The number of moles of activator per gram atom of titanium in the catalyst may be, e.g., from about 1 to about 100 and is preferably greater than about 5.

Alpha-olefins may be polymerized with the catalysts prepared according to aspects of the present invention by any suitable process. Such processes include polymerizations carried out in suspension, in solution or in the gas phase. Gas phase polymerizations are preferred such as those taking place in stirred bed reactors and, especially, fluidized bed reactors.

The molecular weight of the polymer may be controlled in a known manner, preferably by using hydrogen. With the catalysts produced according to aspects of the present invention, molecular weight may be suitably controlled with hydrogen when the polymerization is carried out at relatively low temperatures, e.g., from about 30° to about 105° C. This control of molecular weight may be evidenced by a measurable positive melt index ($I_2$) for the polymer produced.

The catalysts prepared according to aspects of the present invention are highly active and may have an activity of at least from about 3,000 to about 10,000 in terms of grams of polymer produced per hour per gram of catalyst per 100 psi of ethylene pressure.

The catalysts prepared according to aspects of the present invention are particularly useful for the production of linear low density polyethylene polymers. Such linear low density polyethylene polymers may have a density of 0.94 g/cc or less, preferably 0,930 or less or even 0.925 g/cc or less. In accordance with certain aspects of the present invention, it is possible to achieve densities of less than 0.915 g/cc and even 0.900 g/cc or less.

Advantageous properties of linear low density polyethylene polymers are described in the Anderson et al U.S. Pat. No. 4,076,698. These linear low density polyethylene polymers may be polymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alpha-olefin comonomer having at least four carbon atoms in an amount of, e.g., at least 1 percent by weight of the polymer. Accordingly, ethylene/propylene copolymers are possible, but not preferred.

The molecular weight distribution of the polymers prepared in the presence of the catalysts of the present invention, as expressed by the MFR values, varies from about 20 to 30, preferably about 24–28, for LLDPE products having a density of about 0.900 to about 0.940 g/cc, and an $I_2$ (melt index) of about 0.1 to about 100. As is known to those skilled in the art, such MFR values are indicative of a relatively narrow molecular weight distribution of the polymer. As is also known to those skilled in the art, such MFR values are indicative of the polymers especially suitable for injection molding applications since the polymers having such MFR values exhibit relatively low amounts of warpage and shrinkage on cooling of the injection molded products. The relatively low MFR values of the polymers prepared with the catalysts of this invention also indicate that they are suitable for the preparation of various film products since such films are likely to have excellent strength properties. MFR is defined herein as the ratio of the high load melt index (HLMI or $I_{21}$) divided by the melt index ($I_2$), i.e., $$MFR = \frac{I_{21}}{I_2}$$

Smaller MFR values indicate relatively narrow molecular weight distribution polymers.

The linear low density polyethylene polymers produced in accordance with certain aspects of the present invention preferably contain at least about 80 percent by weight of ethylene units. Most preferably, the linear low density copolymers of the invention contain at least 2 weight percent, for example from 2 to 20 weight percent of an alpha olefin copolymerized therein.

A particularly desirable method for producing linear low density polyethylene polymers, according to an aspect of the present invention, is felt to be via a fluid bed reactor. Such a reactor and means for operating same is described in the Levine et al U.S. Pat. No. 4,011,382 or the Karol et al U.S. Pat. No. 4,302,566, each of which is relied upon and incorporated by reference herein. The activity of the catalyst produced in accordance with certain aspects of the present invention is sufficient to produce a linear low density polyethylene polymer which is an ethylene/1-hexene copolymer, e.g., having a density of less than 0.940 g/cc, in such a fluid bed reactor.

As described in the Karol et al U.S. Pat. No. 4,302,566, incorporated by reference herein, relating to a gas phase, fluid bed polymerization, the polymerization reaction is conducted by contacting a stream of the monomers, in a gas phase process, such as in the fluid bed process described below, and substantially in the absence of catalyst poisons such as moisture, oxygen, CO, $CO_2$, and acetylene with a catalytically effective amount of the completely activated catalyst at a temperature and at a pressure sufficient to initiate the polymerization reaction.

In order to achieve the desired density ranges in the copolymers it is necessary to copolymerize enough of the α-olefin comonomers with ethylene to achieve a level of 1 to 5 mol percent of the $C_3$ to $C_8$ comonomer in the copolymer. The amount of comonomer needed to achieve this result will depend on the particular comonomer(s) employed.

In accordance with the invention, it has unexpectedly been found that using a gas phase catalytic polymerization reaction, 1-hexene can be incorporated into an ethylene polymer chain with high efficiency. In other words, a relatively small concentration of 1-hexene monomer in the gas phase reactor can lead to a relatively large incorporation of 1-hexene into the polymer. Thus, 1-hexene can be incorporated into an ethylene polymer chain in a gas phase reactor in amounts up to 15 percent by weight, preferably 4 to 12 percent by weight, to produce linear low density polyethylene having a density of less than 0.940 g/cc. The reaction is preferably conducted in a fluid bed reactor using the catalyst according to the invention.

It is essential to operate the fluid bed reactor at a temperature below the sintering temperature of the polymer particles. To insure that sintering will not occur, operating temperatures below the sintering temperature are desired. For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density of about 0.91 to 0.92, and temperatures of about 80° to 100° C. are used to prepare products having a density of about 0.92 to 0.94, and temperatures of about 90° to 115° C. are used to prepare products having a density of about 0.94 to 0.96.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a rate equal to its consumption. The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accommodate the change in rate of heat generation. This insures the maintenance of an essentially constant temperature in the bed.

The highly active supported catalyst system of this invention appears to yield a fluid bed product having an average particle size between about 0.01 to about 0.07 inches and preferably about 0.02–0.04 inches.

The feed stream of gaseous monomer, with or without inert gaseous diluents, is fed into the reactor at a space time yield of about 2 to 10 pounds/hour/cubic foot of bed volume.

Films having especially desirable properties may be formed with the above-mentioned ethylene/hexene copolymers by a variety of techniques. For example, desirable blown films as well as slot cast films may be formed.

Blown films formed from ethylene/hexene copolymers having a density from 0,916 to 0.928 g/cc may have especially desirable properties for bag structures. For example, such blown films may be fabricated into trash bag structures which, when loaded to capacity, resist breaking when dropped from a height of, e.g., four feet. A particular example of a blown film formed from an ethylene/hexene copolymer having a density of 0.927 and a melt index of 1 (ASTM D-1238, condition E), which is, in turn, formed in a gas phase, fluid bed reactor with a catalyst according to the present invention, is a blown film having an improved dart impact strength, enhanced MD Elmendorf tear strength and higher tensile strength.

Slot cast films formed from low density ethylene/hexene copolymers having a density of from about 0.916 to about 0.92 may have especially desirable properties as pallet stretch wrap. For example, such stretch wrap may hold loads together and onto pallets and resist breaking when subjected to forces encountered in loading operations where loads are moved about, dropped, etc. A particular example of a slot cast film formed from an ethylene/hexene copolymer having a density of about 0.92 and a melt index of 1.7 (ASTM D-1238, condition E), which is, in turn, formed in a gas phase, fluid bed reactor with a catalyst according to the present invention, is a slot cast film having a thickness of 1 mil, an improved MD tensile strength and a very high TD Elmendorf tear strength.

The following Examples give examples of reactants and parameters which may be used in accordance with aspects of the present invention.

EXAMPLES

EXAMPLE A—Catalyst Preparation

All manipulations were conducted under a nitrogen atmosphere by using standard Schlenk techniques. Into a 200 ml Schlenk flask was placed 7.0 grams of Davison grade 955 silica, which was previously dried under a nitrogen purge at 600° C. for about 16 hours. Hexane (90 ml) was added to the silica. Dibutylmagnesium (7.0 mmol) was added to the stirred slurry at 50°–55° C. and stirring was continued for one hour. An alkoxysilane reagent (3.5 or 4.6 or 9.2 mmol) was added to the slurry (50°–55° C.) and stirring was continued for one hour. TiCl$_4$ (7.0 mmol) was added to the reaction flask (50°–55° C.) and stirring was continued for an additional hour. Hexane was then removed by distillation with a nitrogen purge at 50°–55° C. Yield varied from 9–11 grams depending on the alkoxysilane reagent employed. Weight percent of Ti in the catalyst varied from 2.47 to 2.90 depending on the alkoxysilane reagent and the loading.

EXAMPLE B—Polymerization

Ethylene/1-hexene copolymers were prepared with the catalysts of Example A and a typical example is shown below.

Polymerization

A 1.6 liter stainless steel autoclave under a slow nitrogen purge at 50° C. was filled with dry hexane and 1-hexene, and 3.0 mmol of trimethylaluminum (TMA) or triethylaluminum (TEAL) was added. The reactor was closed, the stirring was increased to 900 rpm, and the internal temperature was increased to 85° C. The internal pressure was raised 12–20 psi with hydrogen. Ethylene was introduced to maintain the pressure at about 120 psi. The internal temperature was decreased to 80° C., 10.0–30 mg of catalyst was introduced into the reactor with ethylene over-pressure, and the internal temperature was increased and held at 85° C. The polymerization was continued for 60 minutes, and then the ethylene supply was stopped and the reactor was allowed to cool to room temperature. The polyethylene was collected and air dried.

Catalyst productivities, polymer flow indexes and melt flow ratios (MFR, $I_{21}/I_2$), and mole % hexene in polymer are tabulated in TABLE A below. Catalyst productivities are given in units of gram of polymer/gram of catalyst-hr-100 psi ethylene.

The data show that alkoxysilane-based catalysts are much more active compared to the control catalyst (data points 2–14 vs. 1, 16–18 vs 15). The tetrabutoxysilane-based catalyst at a loading of 0.66 mmol silane per gram of silica is the most active catalyst (data points 9 and 18). Productivities for all the catalysts were higher in the presence of the cocatalyst trimethylaluminum (data point 1 vs 15, 2 vs 16, 8 vs 17).

Polymers from all the alkoxysilane-based catalysts have a much narrower molecular weight distribution compared to that of the control as evident from their much lower MFR values (data points 2–14 vs. 1 and 16–18 vs. 15). At comparable hexene levels, lower resin MFR values and, therefore, narrower molecular weight distributions, were obtained for the trimethylaluminum system compared to that of the triethylaluminum system (data point 2 vs. 16 and 8 vs. 17).

The preferred catalyst is prepared from tetrabutoxysilane at a loading of 0.66 mmol per gram of silica and the preferred cocatalyst is trimethylaluminum (data point 9).

TABLE A

| DATA POINT | SILANE REAGENT | SILANE mmol/g silica | COCATALYST TYPE | 1-HEXANE VOL % | PRODUCTIVITY g/g/hr/100 | FLOW INDEX | 1-HEXANE mole % | MFR $I_{21}/I_2$ |
|---|---|---|---|---|---|---|---|---|
| 1 | NONE | 0.00 | TMA | 33.3 | 1830 | 23.5 | 2.7 | 41.5 |
| 2 | TES | 1.32 | TMA | 25.9 | 2130 | 20.3 | 2.3 | 24.6 |
| 3 | TES | 1.32 | TMA | 33.3 | 2530 | 15.9 | 3.0 | 25.5 |
| 4 | TES | 1.32 | TMA | 40.0 | 2580 | 17.3 | 3.6 | 26.5 |
| 5 | TES | 1.32 | TMA | 53.3 | 3680 | 16.5 | 4.6 | 27.4 |
| 6 | TES | 0.66 | TMA | 23.1 | 3840 | 21.3 | 2.3 | 26.4 |

TABLE A-continued

| DATA POINT | SILANE REAGENT | SILANE mmol/g silica | COCATALYST TYPE | 1-HEXANE VOL % | PRODUCTIVITY g/g/hr/100 | FLOW INDEX | 1-HEXANE mole % | MFR I21/I2 |
|---|---|---|---|---|---|---|---|---|
| 7 | TBS | 1.32 | TMA | 33.3 | 3830 | 21.0 | 3.2 | 25.8 |
| 8 | TBS | 1.32 | TMA | 40.0 | 4460 | 31.5 | 3.9 | 26.6 |
| 9 | TBS | 0.66 | TMA | 33.3 | 6850 | 21.0 | 3.3 | 26.0 |
| 10 | TBS | 0.50 | TMA | 23.1 | 5810 | 57.9 | 3.3 | 26.4 |
| 11 | C-TES | 1.32 | TMA | 33.3 | 2960 | 14.7 | 3.3 | 25.7 |
| 12 | P-TES | 1.32 | TMA | 33.3 | 2630 | 14.9 | 3.1 | 27.1 |
| 13 | TEHS | 0.66 | TMA | 33.3 | 6110 | 53.5 | 4.1 | 28.2 |
| 14 | TAS | 0.66 | TMA | 33.3 | 5120 | 27.1 | 4.1 | 29.3 |
| 15 | NONE | 0.00 | TEAL | 33.3 | 650 | 24.9 | 2.7 | 56.6 |
| 16 | TES | 1.32 | TEAL | 25.9 | 1150 | 14.0 | 1.9 | 25.3 |
| 17 | TBS | 1.32 | TEAL | 40.0 | 1610 | 13.5 | 2.8 | 27.0 |
| 18 | TBS | 0.66 | TEAL | 25.0 | 3610 | 51.6 | 3.0 | 27.5 |

TMA = trimethylaluminum
TEAL = triethylaluminum
TES = tetraethoxysilane
TBS = tetrabutoxysilane
C-TES = chlorotriethoxysilane
P-Tes = phenyltriethoxysilane
TEHS = tetrakis(2-ethylhexoxy)silane
TAS = tetraallyloxysilane Thus it is apparent that there has been provided, in accordance with the invention, a composition which is effective to form copolymers of ethylene . . . , that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A catalyst composition for copolymerization of ethylene with an alpha-olefin to produce linear low density product of narrow molecular weight distribution, prepared by a process which consists essentially of the steps of:

(i) contacting, at a temperature of about 40° to about 60° C., a solid, porous carrier having reactive OH groups with a liquid, said liquid containing a non-polar solvent and at least one organomagnesium composition which is at least partially soluble in said non-polar solvent and wherein the organomagnesium composition has the empirical formula

where R and R' are the same or different $C_1$–$C_{12}$ alkyl groups, and where m+n=2, to form a product of step (i) which contains said carrier and incorporated therein a source of magnesium;

(ii) contacting, at a temperature of about 40° to about 60° C., said product of step (i) with at least one compound of the formula

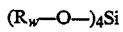

wherein Si is silicon atom; wherein O is oxygen and $R_w$ is hydrocarbyl of 1 to 10 carbon atoms; wherein the said at least one compound is added to provide a molar ratio of silane to Mg on the solid carrier of about 0.30 to about 0.9 to form an intermediate to step (ii), (iii) contacting said intermediate of step (ii) with at least one transition metal compound in a liquid medium, the number of moles of said transition metal compound being in excess of the number of OH groups on said carrier prior to reaction with said organomagnesium composition in step (i), said transition metal compound being soluble in said liquid, and said magnesium of said carrier being substantially insoluble in said liquid medium, whereby a reacted form of transition metal which is insoluble in said liquid medium becomes supported on said carrier; and contacting said reacted form of transition metal with an activating amount of trimethylaluminum.

2. The catalyst of claim 1, prepared by the process, wherein said hydrocarbyl is selected from the group consisting of alkyl, aryl, arylalkyl, alkenyl and arylalkenyl and contains 1 to 10 carbon atoms.

3. The catalyst of claim 1, prepared by the process, wherein said hydrocarbyl contains 2 to 6 carbon atoms.

4. The catalyst composition of claim 1 prepared by the process wherein the carrier is silica and the ratio of the number of moles of said organomagnesium composition to the number of moles of said OH groups on said silica is from about 1.0 to about 2.5; wherein the molar ratio of silane to Mg is 0.20 to 1.40.

5. The catalyst of claim 4, prepared by the process wherein the ratio of the number of moles of said organomagnesium composition to the number of moles of OH groups on said silica is from about b 1.1 to about 2.5.

6. A catalyst composition of claim 5, prepared by the process wherein, in step (i), the ratio of the number of moles of said organomagnesium composition to the number of moles of OH groups on said silica is from about 1.1 to about 1.8.

7. The catalyst of claim 5, prepared by the process wherein the molar ratio of the trimethylaluminum to transition metal ranges from 1 to 500.

8. The catalyst of claim 7, prepared by the process wherein the transition metal compound is a tetravalent titanium compound.

9. The catalyst of claim 8, prepared by the process wherein the transition metal is titanium tetrachloride.

10. A catalyst composition for copolymerization of ethylene with an alpha-olefin to produce linear low density product for injection molding, prepared by a process which consists essentially of the steps of:

(i) contacting, at a temperature of about 40 to about 60° C., a solid, porous carrier having reactive OH groups with a liquid, said liquid containing a non-polar solvent and at least one organomagnesium composition which is at least partially soluble in said non-polar solvent and wherein the organomagnesium composition has the empirical formula $R_m Mg R'_n$ where R and R' are the same or different $C_1$–$C_{12}$ alkyl groups, and where m+n=2, to form a product of step (i) which contains said carrier and incorporated therein a source of magnesium;

(ii) contacting, at a temperature of about 40° to about 60° C., said product of step (i) with at least one silane compound which is selected from the group consisting of tetraethoxysilane, chlorotriethoxysilane, phenyltriethoxysilane, tetrakis(2-ethylhexoxy)silane, tetraallyloxysilane and tetrabutoxysilane. wherein the said at least one silane compound is added to provide a molar ratio of silane to Mg on the solid carrier of about 0.30 to about 0.9 to form an intermediate of step (ii)

(iii) contacting said intermediate of step (ii) with at least one transition metal compound in a liquid medium, the number of moles of said transition metal compound being in excess of the number of OH groups on said carrier prior to reaction with said organomagnesium composition in step (i), said transition metal compound being soluble in said liquid, and said magnesium of said carrier being substantially insoluble in said liquid medium, whereby a reacted form of transition metal which is insoluble in said liquid medium becomes supported on said carrier; and (iv) contacting said reacted form of transition metal with an activating amount of trimethylaluminum.

11. The catalyst composition of claim 10, prepared by the process wherein the ratio of the number of moles of said OH groups on said silica is from about 1.1 to about 2.5.

wherein the molar ratio of silane to Mg is 0.5 to 0.8.

12. The catalyst of claim 11, prepared by the process wherein the ratio of the number of moles of said organomagnesium composition to the number of moles of OH groups on said silica is from about 1.0 to about 2.5.

13. A catalyst composition of claim 12, prepared by the process wherein the ratio of the number of moles of said organomagnesium composition to the number of moles of OH groups on said silica is from about 1.1 to about 1.8.

14. The catalyst of claim 10, prepared by the process wherein the molar ratio of the trimethylaluminum to transition metal ranges from 1 to 500.

15. The catalyst of claim 14, prepared by the process wherein the transition metal compound is a tetravalent titanium compound.

16. The catalyst of claim 15, prepared by the process wherein the transition metal is titanium tetrachloride.

17. The catalyst of claim 1, prepared by the process wherein the silane compound is tetraethyoxysilane or tetrabutoxy silane.

18. The catalyst of claim 23, prepared by the process wherein saline compound is tetraethyoxysilane or tetrabutoxy silane.

19. The catalyst of claim 17, prepared by the process wherein the molar ratio of silicon from said silane to Mg on the solid carrier ranges from about 0.50 to about 0.8.

20. The catalyst of claim 18, prepared by the process wherein the molar ratio of silicon from said silane to Mg on the solid carrier ranges from about 0.50 to about 0.8.

21. The catalyst of claim 19, prepared by the process wherein the organomagnesium composition is dibutylmagnesium.

22. The catalyst of claim 20, prepared by the process wherein the organomagnesium composition is dibutylmagnesium.

23. A catalyst composition for copolymerization of ethylene with an alpha-olefin to produce linear low density product of narrow molecular weight distribution, prepared by a process which consists of the steps of:

(i) contacting, at a temperature of about 40° to about 60° C., a solid, porous carrier having reactive OH groups with a liquid, said liquid containing a non-polar solvent and at least one organomagnesium composition which is at least partially soluble in said non-polar solvent and wherein the organomagnesium composition has the empirical formula $R_m Mg R'_n$ where R and R' are the same or different $C_1$–$C_{12}$ alkyl groups, and where m+n=2, to form a product of step (i) which contains said carrier and incorporated therein a source of magnesium;

(ii) contacting, at a temperature of about 40° to about 60° C., said product of step (i) with at least one silane compound which is selected from the group consisting of tetraethoxysilane, chlorotriethoxysilane, phenyltriethoxysilane, tetrakis(2-ethylhexoxy)silane, tetraallyloxysilane and tetrabutoxysilane, wherein the said at least one silane compound is added to provide a molar ratio of to Mg on the solid carrier of about 0.30 to about 0.9 to form an intermediate of step (ii)

(iii) contacting said intermediate of step (ii) with titanium tetrachloride in a liquid medium, the number of moles of said titanium tetrachloride being in excess of the number of OH groups on said carrier prior to reaction with said organomagnesium composition in step (i), said titanium tetrachloride being soluble in said liquid, and said magnesium of said carrier being substantially insoluble in said liquid medium, whereby a reacted form of titanium tetrachloride which is insoluble in said liquid medium becomes supported on said carrier; and (iv) contacting said reacted form of titanium tetrachloride with an activating amount of trimethylaluminum wherein the molar ratio of trimethylaluminum to titanium ranges from 1 to 500.

* * * * *

UNITED STATES PATENT AND TRADEMARK OFFICE
CERTIFICATE OF CORRECTION

PATENT NO. : 5,336,652

DATED : August 9, 1994

INVENTOR(S) : Robert I. Mink et al.

It is certified that error appears in the above-indentified patent and that said Letters Patent is hereby corrected as shown below:

Col. 14, line 32, Claim 1, insert --(iv)--.

Col. 14, line 49, Claim 5, delete "b" .

Col. 15, line 44, Claim 11, insert --organomagnesium composition to the number of moles of said--.

Signed and Sealed this

First Day of November, 1994

Attest:

Attesting Officer

BRUCE LEHMAN

Commissioner of Patents and Trademarks